(12) United States Patent
Fukuda et al.

(10) Patent No.: US 6,245,456 B1
(45) Date of Patent: Jun. 12, 2001

(54) NON-AQUEOUS ELECTROLYTE BATTERY USING A SEALING BAG COMPRISING HEAT LAMINATED LAYERS

(75) Inventors: Yutaka Fukuda, Osaka; Keiichi Tanaka, Kanuma; Takehiro Hosokawa, Osaka, all of (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 09/285,104

(22) Filed: Apr. 2, 1999

(51) Int. Cl.[7] .................................................. H01M 6/00
(52) U.S. Cl. ..................... 429/122; 429/131; 429/176; 429/178
(58) Field of Search ................................. 429/122, 131, 429/176, 178

(56) References Cited

U.S. PATENT DOCUMENTS 6,001,505  12/1999  Fukuda et al. ...................... 429/176

FOREIGN PATENT DOCUMENTS

| | | |
|---|---|---|
| 57-115820 | 7/1982 | (JP) . |
| 61-240564 | 10/1986 | (JP) . |
| 3-62447 | 3/1991 | (JP) . |
| 9-288998 | 11/1997 | (JP) . |
| 11-7921 | 1/1999 | (JP) . |

*Primary Examiner*—Laura Weiner
(74) *Attorney, Agent, or Firm*—Smith, Gambrell & Russell, LLP

(57) ABSTRACT

A non-aqueous electrolyte battery includes a positive electrode, a negative electrode and an electrolytic solution sealed in a sealing bag, from which lead wires of the positive electrode and the negative electrode are extended to the outside, and the lead wires are also sealed. The battery maintains reliability in hermetic property during long term use. The sealing type non-aqueous electrolyte battery is characterized in that an acid-modified polyethylene, an acid-modified polypropylene or an ionomer is used as a plastic layer of the sealing bag, and preferably both the function of preventing the transmission of water and the function of preventing the transmission of an acid are provided by the plastic layer.

8 Claims, 3 Drawing Sheets

NON-AQUEOUS ELECTROLYTE BATTERY USING A SEALING BAG COMPRISING HEAT LAMINATED LAYERS

FIELD OF THE INVENTION

The present invention relates to a non-aqueous electrolyte battery used as a power source of electronic instruments. More particularly, it is characterized in that it has a structure, in which a positive electrode, a negative electrode and an electrolytic solution are sealed in a sealing bag, and lead wires of the positive electrode and the negative electrode extend to the outside, and has a structure of high reliability in sealing of the electrolytic solution.

BACKGROUND OF THE INVENTION

Along with compactization of electronic instruments, there is an increasing demand for a compact, thin and light-weight battery. On the other hand, there is a demand for a battery having high energy density and high energy efficiency, and thus a secondary battery such as an Li ion battery is drawing attention. In response to these demands, a proposal has been made, for example, in JP-A-61-240564, in which a sealed lead battery is produced in such a manner that electrode arrays are inserted in a bag made of a thermoplastic resin having acid resistance, and a plurality of the electrode arrays are wrapped with an outer sheath in the form of a bag comprising a synthetic resin in the form of a film, a sheet or a tube.

There are other proposals in JP-A-3-62447 and JP-A-57-115820, in which the hermetic property is improved by using a sheet of the sealing bag having a structure, in which a metallic layer is sandwiched between plastic films.

The provision of the metallic layer greatly improves the hermetic property, but the invasion of water from a sealed part cannot be completely prevented. When water invades a battery, it reacts with an electrolytic solution to produce hydrofluoric acid, which passes through the plastic film layer, thereby likely corroding the metallic layer or promoting peeling between the metallic layer and the plastic layer. The reasons for the occurrence of peeling also is due to the use of a urethane-based adhesive as an anchor coating material for bonding the metallic layer and the plastic layer on the side of the electrolytic solution.

SUMMARY OF THE INVENTION

An object of the invention is to provide a non-aqueous electrolyte battery using a sealing bag for a non-aqueous electrolyte battery that prevents the invasion of water as much as possible, and, even when water does invade to produce hydrofluoric acid, does not suffer corrosion of a metallic layer or peeling between the metallic layer and a plastic layer on the side of an electrolytic solution, while maintaining a thin shape, one of the characteristic features of a sealed battery.

As a result of earnest investigation by the inventors, it has been found that the above described object can be accomplished by a means in which an acid-modified polyethylene, an acid-modified polypropylene or an ionomer is used as a plastic, which is directly bonded to a metallic layer by heat lamination to provide a laminated sheet of metal and plastic, and the laminated sheet is used for a sealing bag of the battery with the plastic side facing the electrolytic solution. As the heat lamination, a conventional method that is generally used for bonding plastics can be employed, and preferably conducted at a temperature at which the plastic used is sufficiently softened. Furthermore, it has also been found that by endowing the plastic layer with a function of preventing the transmission of water and a function of preventing the transmission of an acid, the function of preventing the invasion of water can be greatly improved, and even when water does invade to produce hydrofluoric acid, the metallic layer is not corroded, and peeling between the metallic layer and the plastic layer does not occur.

DETAILED DESCRIPTION OF THE INVENTION

The invention is described in detail below with reference to the attached drawings.

Figure 1:
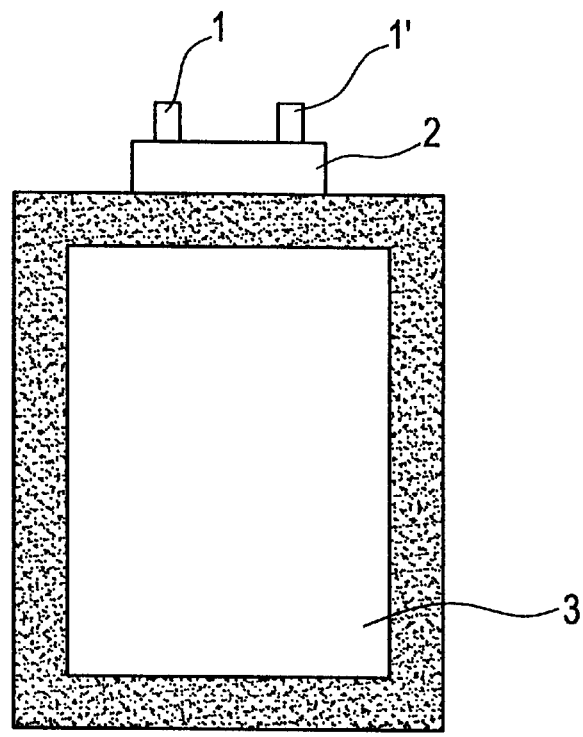
FIG. 1 is a schematic view showing a non-aqueous electrolyte battery using a sealing bag and lead wires according to the invention.
Figure 2:
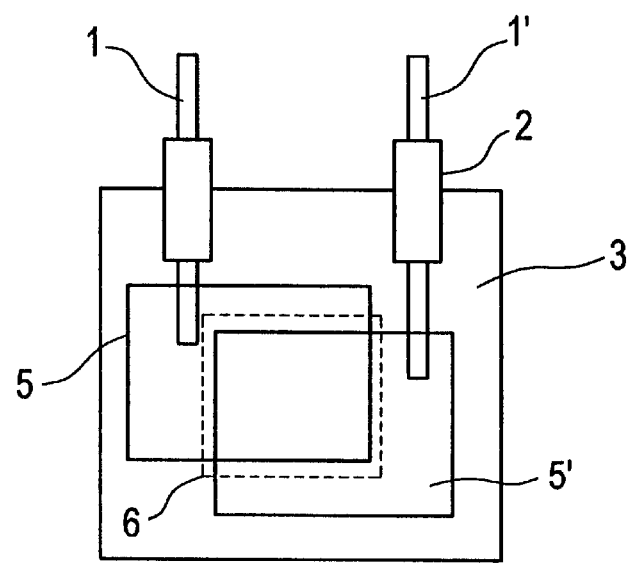
FIG. 2 is a schematic view showing an internal structure of the sealing bag.
Figure 3:
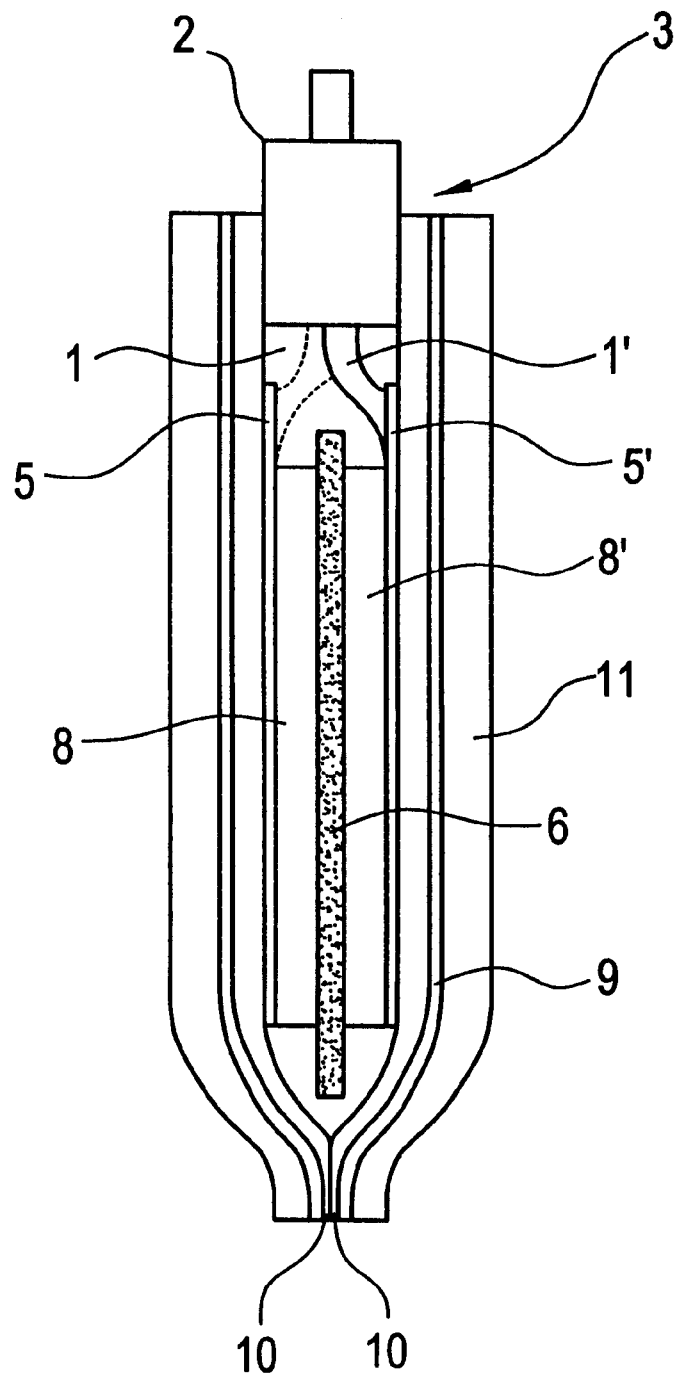
FIG. 3 is a schematic cross sectional view showing the internal structure of the sealing bag.
Figure 4:
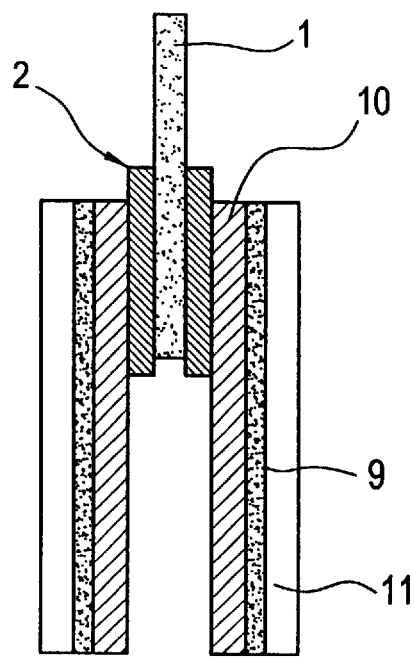
FIG. 4 is an enlarged cross sectional view showing a heat seal part of the sealing bag.

In a battery where electrodes, an electrolyte and separators are inserted in a sealing bag 3 as shown in FIG. 3, the sealing bag 3 is produced by fusing heat seal layers 10, which have direct contact with each other, as the innermost layer inside the sealing bag 3. As schematically shown in FIGS. 2 and 3, a positive electrode 5', a negative electrode 5, a separator 6 and an electrolytic solution 8, 8' are installed in the sealing bag 3. As shown in FIG. 4, the sealing bag 3 and a lead wire 1 are united by heat-fusing the heat seal layer 10 and an insulation 2 of the lead wire 1. The lead wires 1', 1 extend to the outside, which are connected to the positive electrode 5' and the negative electrode 5, respectively, inside the sealing bag 3. The lead wires 1, 1' and the electrodes 5, 5' are connected beforehand and then installed in the sealing bag 3.

The positive electrode 5' and the negative electrode 5 have a structure comprising a metallic substrate, such as a metallic foil and an expanded metal, called a collector, having an active substance formed thereon. The active substance and the separator 6, for the invention can be those usually used in a lithium battery. The method for connecting the lead wire 1 or 1' to the positive electrode 5' or negative electrode 5 is not particularly limited, and a metallic substrate of the electrode and a conductor of the lead wire are preferably connected by spot welding or ultrasonic welding.

As a conductor material for the lead wire connected to the negative electrode, a material that does not easily deform on lithium deposition, i.e., one that does not easily form an alloy with the deposited lithium nor dissolve into the electrolytic solution as metal ion at a high electric potential, is preferable. Accordingly, aluminum, titanium and their alloys preferably are used. As a conductor material of the lead wire connected to the negative electrode, one does not easily on lithium deposition, i.e., strong against the formation of an alloy with lithium and is relatively able to withstand melting at a high electric potential. This is because lithium is deposited on over-charge, and a high electric potential is applied on over-discharge. In view of these conditions, nickel, copper and their alloys are preferably used as the conductor of the lead wire connected to the negative electrode.

With respect to the shape of the conductor of the lead wire, a single wire having a circular or rectangular cross section preferably is used. A wire having a circular cross section creates a problem of low reliability in hermetic property of the sealing bag, particularly when the diameter of the circular cross section of the lead wire conductor is enlarged on account of a large capacity of the battery, because a gap is apt to be formed between the innermost heat-sealing layers 10 of the sealing bag 3 and the outer surface of the insulation 2 of the lead wires sandwiched therebetween.

In the case of using a conductor having a rectangular cross section, the cross sectional area of the conductor can be enlarged by increasing the width of the conductor without increasing its thickness when the capacity of the battery is increased. Thus, it does not bring about low reliability in hermetic property of the sealing bag in the sealing portion between the innermost heat-sealing plastic layers 10 of the sealing bag and the insulation 2 of the lead wires sandwiched therebetween. Furthermore, upon connecting the conductor of the lead wire to an outer circuit using a flexible printed circuit (FPC) and the electrode plate, a conductor having a rectangular cross section can provide a highly reliable connection by spot welding or ultrasonic welding owing to a large contact area.

Though the material of the insulation 2 of the lead wire is not particularly limited, it is particularly preferred to use the same material as the inner plastic layer 10.

As an electrolyte 8, 8', a non-aqueous electrolytic solution or a solid ectrolyte having lithium ion conductivity can be used. The non-aqueous electrolytic solution may be prepared by adding $LiClO_4$, $LiBF_4$, $LiPF_6$ or $LiAsF_6$ to an organic solvent, such as propylene carbonate, γ-butyrolactone, ethylene carbonate, diethyl carbonate, dimethyl carbonate, 1,2-dimethoxyethane and tetrahydrofuran.

The sealing bag 3 preferably comprises a laminated material comprising a metallic foil such as an aluminum foil 9 or a substrate having a metallic vapor deposition layer 9 sandwiched between plastic layers 10 and 11. It is necessary that at least the inner plastic layer 10 on the side of the electrolytic solution not dissolve in the electrolyte.

One of the important features of the invention resides in the material of the plastic layer 5 constituting the sealing bag 3. An example of the constitution of the sealing bag 3 includes a laminated material comprising an aluminum foil 9 having PET films 11 adhered on the outer side thereof and further having a thermoplastic resin 10 (such as polyethylene) adhered on the inner surface thereof. The outer PET film 11 is provided to protect the aluminum foil 9 from external flaws, and the inner polyethylene 10 is provided to conduct the heat sealing. In such a material that has been conventionally designed, water gradually invades upon long term storage after the heat sealing, and the water reacts with the electrolytic solution sealed in the bag to produce hydrofluoric acid. The hydrofluoric acid thus produced passes through the polyethylene, and causes peeling of the adhered interface between the aluminum and polyethylene. This is one of the reasons why such a bag-type battery container has not been practically used.

In order to solve the problem, the inventors of the invention have found that when an acid-modified polyethylene, an acid-modified polypropylene or an ionomer is used in the plastic layer 10 on the side of the electrolytic solution, it adheres directly to the metallic layer 9 by heat lamination without using an adhesive. Furthermore, it has also been found that it is preferred to endow the plastic layer 10 with functions of preventing the transmission of water and the transmission of an acid.

In order to endow the function of preventing the transmission of water to the plastic layer 10, a resin mixed with an inorganic filler comprising at least one member selected from the group consisting of hydrotalcites and magnesium sulfate, from which water of crystallization has been removed by baking, can be used. The inorganic filler preferably has an average diameter of 10 µm or less. When the average diameter exceeds 10 µm, it is difficult to produce a thin film. The added amount of the inorganic filler is preferably from 5 to 50 parts by weight per 100 parts by weight of the resin. When the added amount is less than 5 parts by weight, water may possibly pass through the plastic film due to poor water adsorbing capacity.

In order to endow the function of preventing the transmission of an acid to the plastic layer 10, a resin mixed with a metal salt of a carboxylic acid or a metal oxide can be used. Preferred examples of the metal salt of carboxylic acid and the metal oxide include calcium carbonate, magnesium oxide, hydrotalcites and calcium stearate, and a stabilizer for polyvinyl chloride can also be used effectively. These fillers preferably have an average diameter of 10 µm or less. When the average diameter exceeds 10 µm, it is difficult to produce a thin film. The added amount of fillers is preferably from 1 to 20 parts by weight per 100 parts by weight of the resin. When the added amount is less than 1 part by weight, acid may possibly pass through the plastic film due to poor acid adsorbing capacity.

Both the function of preventing the transmission of water and the function of preventing the transmission of an acid can be realized by endowing both functions to one plastic layer. When both the filler having the function of preventing the transmission of water and the filler having the function of preventing the transmission of an acid are added to the resin, it is preferred that the total added amount of the fillers is 100 parts by weight or less. When it exceeds 100 parts by weight, film formation becomes difficult, which results in a failure to produce a battery. Alternatively, both the functions are realized by laminating a plastic layer having the function of preventing the transmission of water and a plastic layer having the function of preventing the transmission of an acid.

An acid-modified polyethylene, an acid-modified polypropylene and an ionomer, which do not corrode by the electrolytic solution, are preferably used as the resin constituting the plastic layers of the invention. A material corrodible by the electrolytic solution may be used by employing a resin layer that is not easily corroded by the electrolytic solution on the inner surface thereof.

A preferred structure of the sealing bag of the invention includes one comprising a plastic film 11, a metallic foil 9, a single-layered or multilayered thermoplastic resin layer 10 from the outside to the inside. The plastic layer 11 is provided outside the metallic foil layer 9 to reinforce the metallic layer 9 against breakage. The plastic layer 11 preferably comprises engineering plastics excellent in wear resistance, such as polyethylene terephthalate (PET) and nylon. As the metallic layer 9, an aluminum foil is preferably used since it is lightweight and relatively strong against corrosion. In view of the performance of the battery, other materials may also be used. The plastic film 11 of the outer layer and the metallic foil layer 9 are adhered to each other by using an adhesive, such as urethane, epoxy and polyester resins. In the invention, although no adhesive is used inside the metallic layer 9, the adhesion may be conducted by using an adhesive outside the metallic layer 9. In the case where a vapor deposition film is used as the metallic foil layer 9, for example, aluminum may be directly vapor-deposited on a PET film 11 to produce a 2-layer film of PET/aluminum.

On the inner surface of the 2-layer 11 film of the plastic layer and the metallic layer 9, a plastic layer 10 including a trapping layer is adhered directly to the metallic layer 9 by heat lamination.

The thickness of the outer plastic layer 11 is preferably from 6 to 50 $\mu$m. When it is less than 6 $\mu$m, the strength thereof is insufficient. When it exceeds 50 $\mu$m, it becomes too hard, making it difficult to seal the sealing bag by heat sealing.

The thickness of the metallic layer 9 is preferably 50 $\mu$m or less. When it exceeds 50 $\mu$m, it becomes too hard, making it difficult to seal the sealing bag by heat sealing.

The thickness of the inner plastic layer 10 is preferably from 30 to 150 $\mu$m in total irrespective of whether it is single-layered or multilayered. When it is less than 30 $\mu$m, it is too thin, and the reliability of the hermetic property decreases. When it exceeds 150 $\mu$m, it becomes difficult to achieve the aim of a battery using a sealing bag, i.e., a thin battery.

The invention is described in added detail with reference to the following Examples.

EXAMPLES 10 parts by weight of graphite and 10 parts by weight of polyvinylidene fluoride were mixed with 100 parts by weight of $LiCoO_2$ powder (produced by Nippon Chemical Industry Co., Ltd.), which were then dissolved in N-methyl-2-pyrrolidone, and made into a paste form. The paste was coated on one surface of an aluminum foil having a thickness of 20 $\mu$m, and after drying, it was pressed with a roller. Thus, an electrode having a thickness of 0.1 mm, a width of 50 mm and a length of 105 mm (5 mm of the length was not coated) was produced as a positive electrode.

20 parts by weight of polyvinylidene fluoride was mixed with 100 parts by weight of a fibroblastic natural graphite powder, which were then dissolved in N-methyl-2-pyrrolidone, and made into a paste form. The paste was coated on both surfaces of a copper foil having a thickness of 20 $\mu$m, and after drying, it was pressed with a roller. Thus, an electrode having a thickness of 0.10 mm, a width of 50 mm and a length of 105 mm (5 mm of the length was not coated) was produced as a negative electrode.

A separator comprising a fine porous film of polypropylene having a thickness of 25 $\mu$m was sandwiched between the resulting positive electrode and the negative electrode, and lead wires were connected, by ultrasonic welding, to the aluminum foil (positive electrode) and the copper foil (negative electrode) at the portions where the active substance was not coated. They were inserted in a sealing bag as shown in FIG. 2, into which 8 cc of an electrolytic solution was then injected. After conducting impregnation under vacuum, the lead wires were sandwiched by the sealing bag, and the inner layer of the sealing bag and the outer insulation of the lead wire were heat-fused by a sealing machine (sealing width: 10 mm) under the condition of 200° C. and 5 seconds, so as to produce a test battery. The electrolytic solution was obtained by mixing ethylene carbonate and diethyl carbonate at a ratio of 1/1 by volume and dissolving lithium phosphate hexafluoride therein to make a concentration of 1 mol/L.

The sealing bag was produced by the following method.

A sheet having the constitution shown in Table 1 was cut into a rectangular shape (70 mm×135 mm), and two pieces thereof were set facing each other with the PET side on the outside. Three edges of the rectangle were heat-sealed in a width of 3 mm to obtain a sealing bag.

TABLE 1

| Constitution of Sealing Bag | |
|---|---|
| PET | 12 $\mu$m |
| Urethane adhesive | 5 $\mu$m |
| Aluminum foil | 9 $\mu$m |
| Acid-modified LDPE* | 20 $\mu$m |
| Heat seal layer Y | 30 $\mu$m |
| Heat seal layer Z | 30 $\mu$m |

*low-density polyethylene

The sheet was produced by the following method. On an aluminum foil surface of a film obtained by laminating a PET film and an aluminum foil using a urethane-based adhesive, an acid-modified LDPE was extrusion-coated to a thickness of 20 $\mu$m, and they were directly adhered by heat lamination, so as to obtain the sheet, which were common in all the Examples and Comparative Examples. Various kinds of heat seal layer films were then adhered on the resulting sheet by heat lamination.

The heat seal layer films were obtained by molding the resin mixtures shown in Table 2 by a T-die extruder to a film shape having a prescribed thickness.

TABLE 2

| | Composition of Resin of Heat Seal Layer | | | | | | | | | | |
|---|---|---|---|---|---|---|---|---|---|---|---|
| Filler | A | B | C | D | E | F | G | H | I | J | K |
| Acid-Modified LDPE | 100 | 100 | 100 | 100 | 100 | 100 | 100 | 100 | 100 | 100 | 100 |
| Baked hydrotalcite | 30 | — | — | — | — | — | — | — | — | — | — |
| Magnesium sulfate | — | 10 | 30 | 100 | 120 | 30 | — | — | — | — | — |
| Calcium carbonate | — | — | — | — | — | 10 | 10 | — | — | — | — |
| Magnesium oxide | — | — | — | — | — | — | — | 5 | 100 | 120 | — |

(unit: parts by weight)

With the constitution of the sealing bag shown in Table 1, the production of test batteries was attempted by using sealing bags, in which the heat seal layer Y and the heat seal layer Z were changed. The compositions of the resins used in the heat seal layers are shown in Table 3, and the intended effects of the compositions are explained below.

TABLE 3

| Compositions of Heat Seal Layers of Sealing Bag used in Test Batteries | | |
|---|---|---|
| | Heat Seal Layer Y | Heat Seal Layer Z |
| Example 1 | C | A |
| Example 2 | C | G |
| Example 3 | C | H |

TABLE 3-continued

Compositions of Heat Seal Layers of Sealing Bag used in Test Batteries

|  | Heat Seal Layer Y | Heat Seal Layer Z |
|---|---|---|
| Example 4 | C | I |
| Example 5 | B | G |
| Example 6 | D | G |
| Example 7 | A | K |
| Example 8 | F | K |
| Comparative Example 1 | K | K |
| Comparative Example 2 | E | G |
| Comparative Example 3 | C | K |
| Comparative Example 4 | G | K |
| Comparative Example 5 | C | J |

Example 1

30 parts by weight of baked hydrotalcite was used as an acid trapping agent, and 30 parts by weight of magnesium sulfate was used as a water trapping agent.

Example 2

The same composition as in Example 1 was used except that the acid trapping agent was changed to 10 parts by weight of calcium carbonate.

Example 3

The same composition as in Example 1 was used except that the acid trapping agent was changed to 5 parts by weight of magnesium carbonate.

Example 4

The same composition as in Example 3 was used except that the amount of the acid trapping agent (magnesium carbonate) was changed to 100 parts by weight.

Example 5

The same composition as in Example 2 was used except that the amount of the water trapping agent (magnesium sulfate) was changed to 10 parts by weight.

Example 6

The same composition as in Example 2 was used except that the amount of the water trapping agent (magnesium sulfate) was changed to 100 parts by weight.

Example 7

Figure 5:
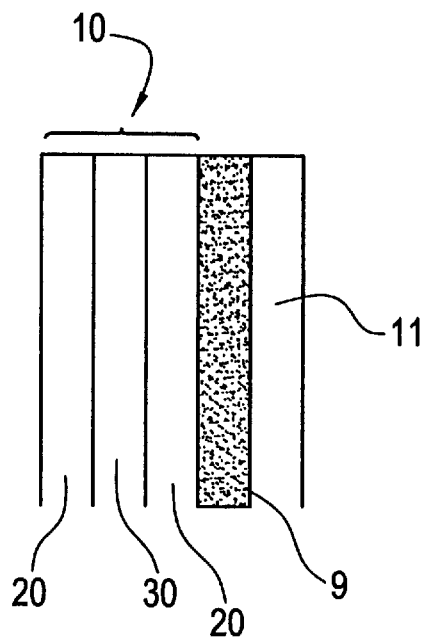
FIG. 5 is an enlarged cross sectional view showing the heat seal layer of Example 7.

30 parts by weight of baked hydrotalcite was used to function as both the water trapping agent and the acid trapping agent. This example is shown in FIG. 5, which is an enlarged schematic view of the heat seal layer 10. In FIG. 5, numeral 9 denotes an aluminum foil, 11 denotes a PET layer, 20 denotes an acid-modified LDPE layer, and 30 denotes an acid-modified LDPE layer containing hydrotalcite.

Example 8

A mixture of 30 parts by weight of magnesium sulfate as a water trapping agent and 10 parts by weight of calcium carbonate as an acid trapping agent was used in one layer.

Comparative Example 1

No trapping agent was used.

Comparative Example 2

The same composition as in Example 2 was used except that the amount of the water trapping agent (magnesium sulfate) was changed to 120 parts by weight.

Comparative Example 3

No acid trapping layer was provided.

Comparative Example 4

No water trapping layer was provided.

Comparative Example 5

The same composition as in Example 3 was used except that the amount of the acid trapping agent (magnesium carbonate) was changed to 120 parts by weight.

Comparative Example 6

A laminated film of PET (12 $\mu$m)/urethane-based adhesive (5 $\mu$m)/aluminum foil (9 $\mu$m), and a 3-layer film of an acid-modified LDPE (20 $\mu$m) and the heat seal layers Y and Z having the constitution in Example 7 were prepared. The aluminum foil surface of the former and the acid-modified LDPE surface of the latter were adhered through a urethane-based anchor-coating material, so as to obtain a sealing bag.

In Comparative Examples 2 and 5, the composition could not be made into a film having a thickness of 100 $\mu$m or less since the amount of the filler was too large, and thus a test battery could not be produced. In Examples 1 to 8 and Comparative Examples 3 and 4, test batteries were produced and subjected to the reliability test described below.

The effect of the invention was confirmed by conducting the reliability test for the test batteries prepared above.

A test battery was placed in a thermo-hygrostat at 60° C. and 95%RH, and was allowed to stand for 1,000 hours. The concentration of hydrofluoric acid contained in the electrolytic solution was then measured, and the external condition of the bag was observed. The concentration of hydrofluoric acid was measured by titration with a sodium hydroxide solution having a concentration of 0.1 mol/L.

The results of the reliability test are shown in Table 4.

TABLE 4

Results of Reliability Test of Test Batteries

| Evaluation items | Example 1 | Example 2 | Example 3 | Example 4 | Example 5 | Example 6 | Example 7 | Example 8 |
|---|---|---|---|---|---|---|---|---|
| External change | none | none | none | none | none | none | none | none |
| Hydrofluoric acid concentration (wt %) | | | | | | | | |
| Initial | 0.004 | 0.004 | 0.004 | 0.004 | 0.004 | 0.004 | 0.004 | 0.004 |
| After | 0.006 | 0.007 | 0.007 | 0.007 | 0.007 | 0.006 | 0.008 | 0.007 |

TABLE 4-continued

Results of Reliability Test of Test Batteries

| Evaluation items | Comparative Example 1 | Comparative Example 2 | Example 3 Comparative | Example 4 Comparative |
|---|---|---|---|---|
| External change | Aluminum corroded, considerable peeling | Slight peeling | Slight peeling | Slight peeling |
| Hydrofluoric acid concentration (wt %) | | | | |
| Initial | 0.004 | 0.004 | 0.004 | 0.004 |
| After storage | 0.035 | 0.008 | 0.031 | 0.008 |

In Comparative Examples 1 and 4, in which a sealing bag having no water trapping agent was used, the concentration of hydrofluoric acid was largely increased, and particularly in Comparative Example 1, in which an acid trapping layer was not provided, the aluminum layer of the sealing bag was corroded, and interlayer peeling between the aluminum layer and the heat seal layer occurred, due to hydrofluoric acid. In Comparative Example 4, slight peeling between the aluminum layer and the heat seal layer was observed, which indicated that the hydrofluoric acid trapping effect diminished. In Comparative Example 3, in which a hydrofluoric acid trapping agent was not used, interlayer peeling between the aluminum layer and the heat seal layer was observed, which indicated that they were affected by the formation of slight amounts of hydrofluoric acid. In Comparative Example 6, slight peeling was observed due to the use of the urethane-based adhesive.

On the other hand, the samples using sealing bags of Examples 1 to 8 exhibited no external change even after the lapse of 1,000 hours. The concentration of hydrofluoric acid was slightly increased, which indicated that the invasion of water could not be completely prevented. However, the hydrofluoric acid that was formed by the reaction of the water and the electrolytic solution was adsorbed by the acid trapping agent, and thus corrosion of the aluminum layer of the sealing bag, and peeling between the aluminum layer and the heat seal layer were prevented, thereby maintaining the performance of the battery. Accordingly, advantages of the invention could be confirmed.

What is claimed is:

1. A non-aqueous electrolyte battery, comprising:
    a positive electrode;
    a negative electrode;
    an electrolytic solution between the positive electrode and the negative electrode;
    a sealing bag into which the positive electrode, the negative electrode, and the electrolytic solution are sealed, wherein the sealing bag includes an interior surface that faces the electrolytic solution and an exterior surface opposite the interior surface, wherein the sealing bag is composed of a laminated sheet including:
    (a) a metallic layer or a substrate having a metallic vapor deposition layer thereon, and (b) one or more plastic layers located closer to the interior surface of the sealing bag than the metallic layer or the substrate having the metallic vapor deposition layer thereon, wherein the metallic layer or the substrate having the metallic vapor deposition layer is directly adhered to one of the one or more plastic layers by heat lamination, and wherein at least one of the one or more plastic layers is mainly comprised of an acid-modified polyethylene, an acid-modified polypropylene, or an ionomer;
    a first lead wire electrically connected with the positive electrode and extending outside of the sealing bag; and
    a second lead wire electrically connected with the negative electrode and extending outside of the sealing bag.

2. A non-aqueous electrolyte battery as claimed in claim 1, wherein at least one of said one or more plastic layers has both a function of preventing transmission of an acid and a function of preventing transmission of water.

3. A non-aqueous electrolyte battery as claimed in claim 2, wherein the plastic layer having both a function of preventing the transmission of an acid and a function of preventing the transmission of water is a resin layer comprising 100 parts by weight of a thermoplastic resin, 100 parts by weight or less of a metal salt of a carboxylic acid or a metal oxide, and 100 parts by weight or less of at least one member selected from the group consisting of hydrotalcites and magnesium sulfate, from which water of crystallization has been removed by baking.

4. A non-aqueous electrolyte battery as claimed in claim 3, wherein said metal salt of carboxylic acid or said metal oxide is one or a mixture of two or more members selected from the group consisting of calcium carbonate, magnesium oxide and hydrotalcites.

5. A non-aqueous electrolyte battery as claimed in claim 1, wherein one of said one or more plastic layers has a function of preventing transmission of an acid, and another of said one or more plastic layers has a function of preventing transmission of water.

6. A non-aqueous electrolyte battery as claimed in claim 5, wherein the plastic layer having a function of preventing the transmission of an acid is a resin layer comprising 100 parts by weight of a thermoplastic resin and 100 parts by weight or less of a metal salt of a carboxylic acid or a metal oxide; and the plastic layer having a function of preventing the transmission of water is a resin layer comprising 100 parts by weight of a thermoplastic resin and 100 parts by weight or less of at least one member selected from the group consisting of hydrotalcites and magnesium sulfate, from which water of crystallization has been removed by baking.

7. A non-aqueous electrolyte battery as claimed in claim 4, wherein said metal salt of carboxylic acid or said metal oxide is one or a mixture of two or more members selected from the group consisting of calcium carbonate, magnesium oxide and hydrotalcites.

8. A non-aqueous electrolyte battery as claimed in claim 1, wherein the metallic layer or the substrate having the metallic vapor deposition layer thereon adheres directly to the one or more plastic layers by heat lamination without using an adhesive.

* * * * *